United States Patent [19]

Bishop

[11] 4,160,884

[45] Jul. 10, 1979

[54] POWER REGULATION SYSTEM FOR REPEATERED TELEPHONE TRANSMISSION LINES

[75] Inventor: Larry D. Bishop, Colleyville, Tex.

[73] Assignee: Wescom, Inc., Downers Grove, Ill.

[21] Appl. No.: 875,330

[22] Filed: Feb. 6, 1978

[51] Int. Cl.$^2$ ............................................. H04B 3/44
[52] U.S. Cl. ................................. 179/170 J; 323/4; 323/21
[58] Field of Search ...................... 363/41, 79, 23, 25; 323/4, 21, DIG. 1; 179/170 R, 170 J; 361/18

[56] References Cited

U.S. PATENT DOCUMENTS

| | | | |
|---|---|---|---|
| 3,701,937 | 10/1972 | Combs ..................................... | 363/50 |
| 3,769,568 | 10/1973 | Hamilton et al. ...................... | 363/25 |
| 3,781,480 | 12/1973 | Roge ..................................... | 179/16 F |
| 3,818,307 | 6/1974 | Hamilton et al. ...................... | 363/25 |
| 3,839,668 | 10/1974 | Black ..................................... | 363/97 |
| 4,002,963 | 1/1977 | Hunter ................................... | 363/41 |
| 4,058,758 | 11/1977 | Peterson ................................ | 363/21 |

OTHER PUBLICATIONS

"3RU14 Line Repeater Unit;" Lynch Communications Systems Brochure; Section 4, pp. 2041-1, 2041-2; May 1971.

W. H. Sahm; "General Electric Optoelectronics Manual;" 1976; p. 72.

Primary Examiner—Kathleen H. Claffy
Assistant Examiner—Randall P. Myers
Attorney, Agent, or Firm—Leydig, Voit, Osann, Mayer & Holt, Ltd.

[57] ABSTRACT

A telephone transmission system has repeaters spaced along both the transmit and receive legs of the transmission line, with a power supply for the repeaters including a current regulator having positive and negative supply lines connecting the power supply to the two legs of the transmission line. Current surge protectors are connected from the two legs of the transmission line to ground. A pair of current sensors responsive to the current levels in the positive and negative supply lines, between the power supply and the current surge protectors closest to the power supply, produce output signals representative of the respective current levels. A control signal generating means receives the output signals from the current sensors and produces a control signal in response to a deviation of the higher current in the supply lines from a preselected reference level. The control signal is supplied to the current regulator to maintain the higher current level in the supply lines at the preselected reference level.

6 Claims, 3 Drawing Figures

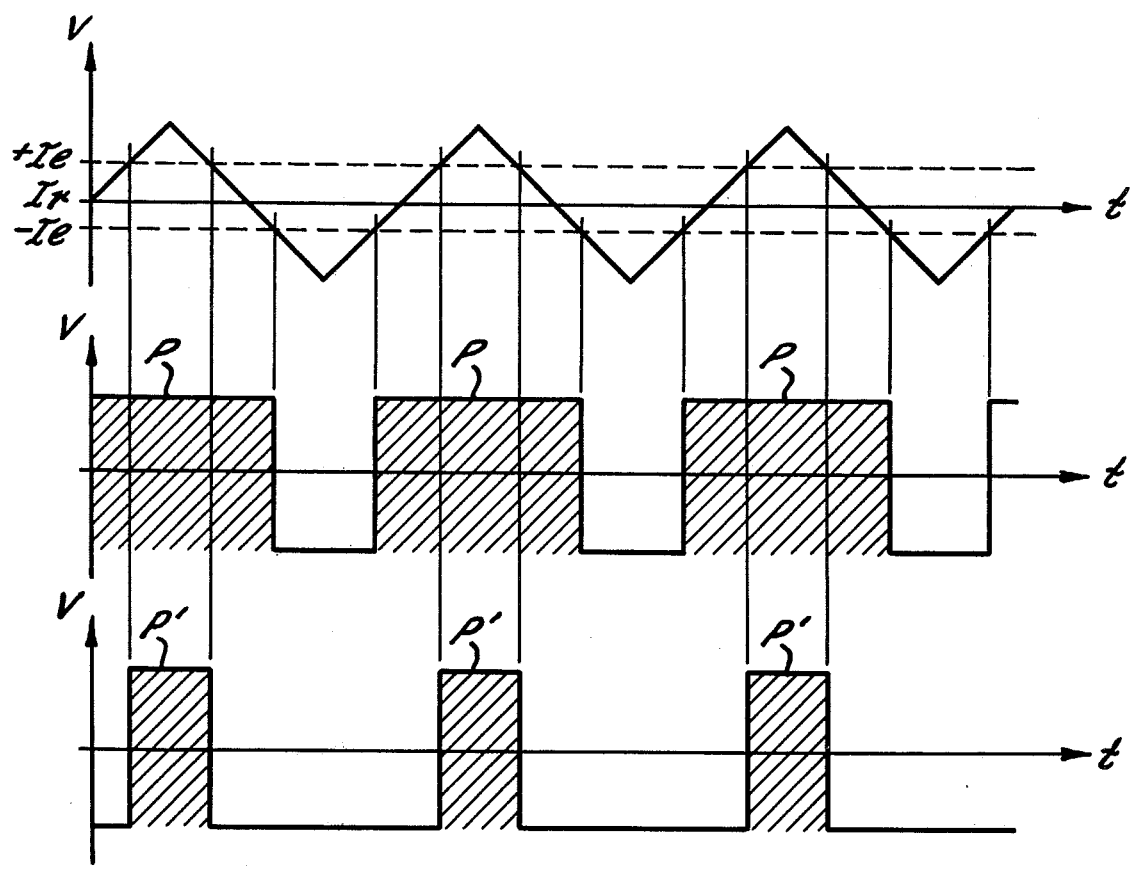
_Fig.3._

POWER REGULATION SYSTEM FOR REPEATERED TELEPHONE TRANSMISSION LINES

DESCRIPTION OF THE INVENTION

The present invention relates generally to telephone transmission systems and, more particularly, to current regulation systems for powering digital and/or analog repeatered transmission lines.

Repeatered transmission lines are used in both digital and analog telephone transmission systems. In the digital pulse-code-modulated (PCM) system a number of analog signals are digitized, multiplexed and transmitted as digital pulses on a transmission line comprising a two-conductor cable. In order to maintain the desired timing and amplitude of the PCM pulses, regenerative repeaters are interposed at predetermined intervals along the transmission line to retime, reshape and regenerate pulses. To provide power to the regenerative repeaters along the transmission line, the two conductors carry d-c. current in addition to carrying the PCM pulses. Repeaters are used in analog telephone transmission systems.

In existing systems that provide regulated d-c. power over the transmission line, either the positive or negative leg of the line connected to the d-c. power supply is provided with a constant current regulator to assure proper operation of the repeater amplifiers during normal conditions. The other leg is typically provided only with a fuse. These conventional systems also normally include a terminal carrier group alarm (CGA) which will disconnect and busy-out all trunks for 20 seconds in the event of a fault (e.g., a short circuit to ground) which interrupts the transmission line for a short period of time.

Normally a CGA is not triggered until a fault persists for 200 milliseconds or longer. The duration of most lightning surges is less than 10 milliseconds, so a CGA is usually not triggered by a lightning surge unless one of the current surge protectors (generally gas discharge tubes) continues to conduct after termination of the surge, i.e., longer than 200 milliseconds. These protectors are designed to extinguish as soon as the lightning surge terminates, so that the total conduction interval is usually substantially less than the 200 milliseconds required to trigger a CGA. However, when the protector is within about a mile of an unregulated power supply terminal, it can continue to draw current after termination of a lightning surge, and the total time that the protector remains conductive can easily exceed 200 milliseconds, thereby triggering a CGA. The CGA then disconnects the trunks for 20 seconds, which causes an undesirable loss of the transmission time.

Furthermore, sustained current flow through a surge protector can blow the fuse that is normally provided near the unregulated power supply terminal. This renders the entire system inoperative until the fuse can be replaced, resulting in an even longer loss of transmission time than caused by a CGA.

It is a primary object of the present invention to provide an improved current regulation system for powering repeatered telephone transmission lines, which improves the reliability of the transmission during electrical storms, accidental grounding and the like.

It is a more specific object of this invention to provide such an improved current regulation system for repeatered transmission lines which effectively regulates the line current in the event of grounding of either the positive or negative leg at any point between the positive and negative power supply terminals, regardless of how close the ground is to the power supply terminals.

A further object of this invention is to provide such an improved current regulation system for repeatered transmission lines which does not dissipate an excessive amount of power.

A still further object of the invention is to provide such an improved current regulation system for repeatered transmission lines which reduces equipment maintenance requirements, with corresponding reductions in losses of transmission time.

Yet another object of the invention is to provide such an improved current regulation system which functions independently of ambient temperature and with a high degree of efficiency.

Other objects and advantages of the invention will be apparent from the following detailed description and the accompanying drawings, in which:

FIG. 3 is a series of wave forms illustrating the operation of certain portions of the current regulation system shown in FIG. 2.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
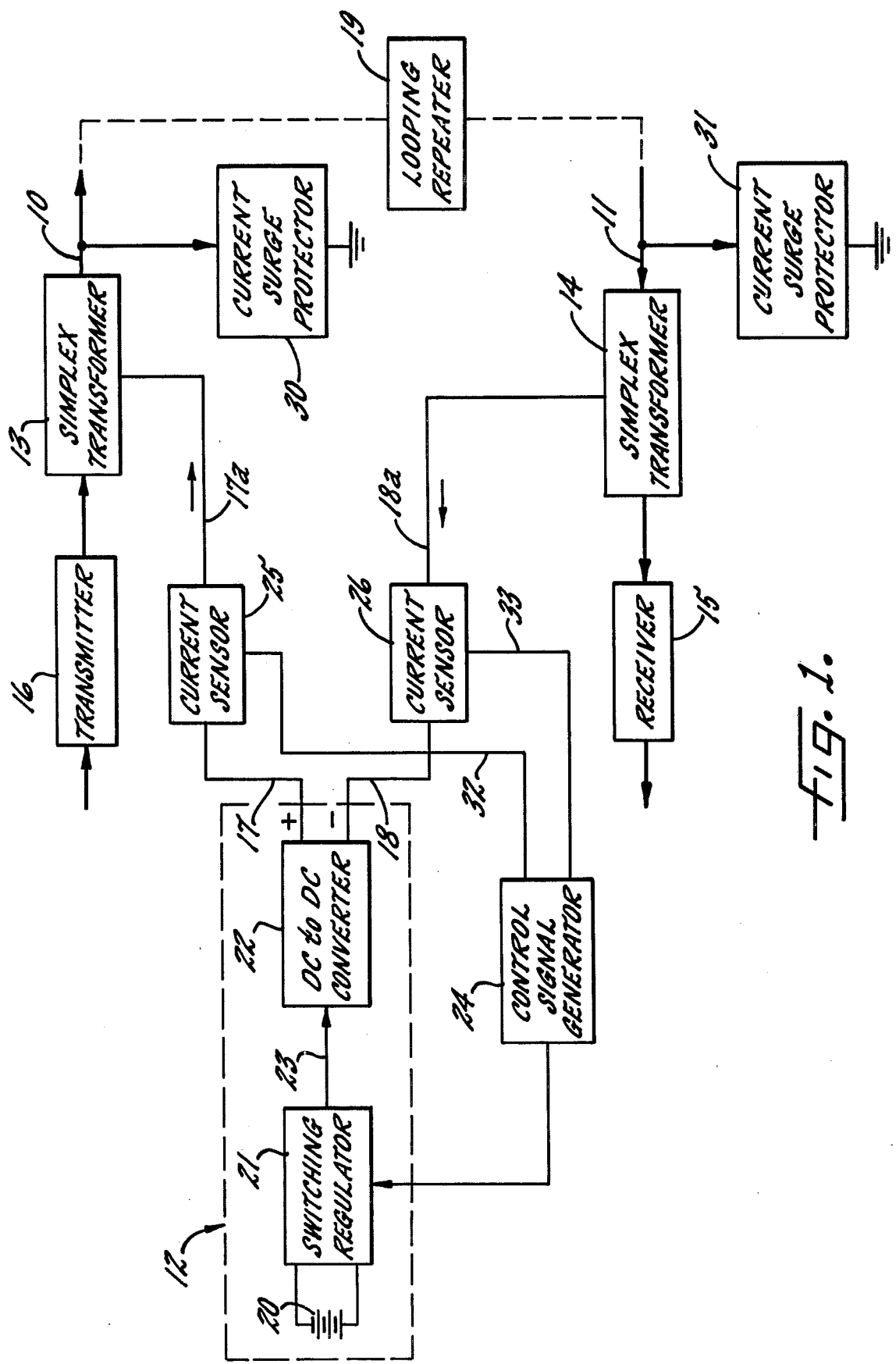
FIG. 1 is a block diagram of a current regulation system embodying the present invention.

Turning now to the drawings and referring first to the block diagram of FIG. 1, there is illustrated a current regulation system for supplying current at a regulated level to a two-pair PCM transmission line having repeaters spaced along both the two-wire transmit leg 10 and the two-wire receive leg 11. More specifically, d-c. current is supplied from a power supply 12 to the repeatered legs 10 and 11 through simplex transformers 13 and 14, respectively. The two legs 10 and 11 carry pulses to and from a receiver 15 and a transmitter 16, respectively, as well as the d-c. supply current for repeaters (not shown) spaced along the legs 10 and 11. Thus, the d-c. current flows from the positive power supply terminal 17 of the power supply through line 17a and the simplex transformer 13 to the repeaters in the transmit leg 10. This current crosses over to the receive leg 11 through a looping repeater 19, at some point downstream from the simplex transformer 13, and returns to the negative power supply terminal 18 through the receive leg 11 and the repeaters therein, the simplex transformer 14, and line 18a.

The power supply 12 comprises a d-c. voltage source 20, a switching regulator 21 and a d-c.-to-d-c. converter 22. The d-c. voltage source 20 may represent a 48-volt office battery which supplies power to the switching regulator 21 for producing a d-c. voltage on a line 23 in response to control pulses derived from a control signal generator 24. Internally, the regulator 21 produces a series of pulses which are typically pulse width modulated according to the width of the control pulses produced by the generator 24 so that the d-c. power supplied to the converter 22 can be regulated by modulating the pulse width. The d-c.-to-d-c. converter 22 converts the d-c. voltage level on line 23 to the particular d-c. level required at the power supply terminals 17 and 18.

To maintain a substantially constant level of current flow in the transmit and receive legs 10 and 11, the width of the constant frequency pulses produced within the regulator 21 is continually modulated in accordance with the power drawn by the repeaters along the legs 10 and 11. For example, when the current drawn by the transmit leg 10 decreases, the resulting reductions in current flow through a sensor 25 immediately initiates the generation of a feedback signal for the control signal generator 24 to increase the width of the pulses produced within the regulator 21. This increase in the pulse width increases the magnitude of the d-c. output voltage from the regulator 21 and the converter 22, thereby holding the output current at a substantially constant level. Conversely, when the current drawn by the transmit leg 10 increases, the resulting increase in current flow through the sensor 25 initiates the generation of a feedback signal which decreases the width of the pulses produced within the regulator 21. This decrease in the pulse width decreases the magnitude of the d-c. output voltage, again maintaining a substantially constant level of output current. Consequently, the level of current flow through the sensor 25 is maintained essentially constant in spite of variations in the transmit leg 10 and/or the input source 20. As the width of the pulses increases, the magnitude of the d-c. output voltage increases; and as the width of the pulses decreases, the magnitude of the d-c. output voltage also decreases.

To protect the repeaters along the transmission line from lightning surges, surge current protectors 30 and 31 are connected from the respective transmit and receive legs 10 and 11 to ground, and similar protectors are provided at the input and output of each successive repeater (not shown). As mentioned previously, these protectors are rendered conductive by an excessive voltage surge so that the potentially damaging surge of current is shunted to ground before it reaches a repeater. Ideally, any protector that is rendered conductive returns to its normal nonconductive state as soon as the current surge is dissipated. The total conductive interval for a protector is typically only 10 milliseconds or less, which interrupts the signal transmission for such a short time that it appears as only a momentary "click" to the listener.

In accordance with one important aspect of the present invention, current sensors are provided in both the positive and negative power supply lines leading to the transmit and receive legs, with each sensor located between the corresponding power supply terminal and the current surge protector closest to that terminal. The sensors produce output signals representative of the respective current levels in the power supply lines, and these output signals are supplied to the control signal generator to produce a compensating control signal in response to any deviation of the current from a preselected level in either power supply line. Thus, in the illustrative embodiment, the current sensor 25 in the positive supply line 17a and a second current sensor 26 in the negative supply line 18a are both connected between the power supply 12 and one of the simplex transformers 13 and 14. These sensors 25 and 26 produce "sensed current" output signals on lines 32 and 33 proportional to the respective current levels in the lines 17a and 18a. The lines 32 and 33 supply these "sensed current" signals to the control signal generator 24 where they are used to adjust the output of the generator 24 whenever the current in either the positive or negative supply line 17a or 18a deviates from a preselected level.

With the system of the present invention, a short circuit due to conduction of a current surge protector, or any other cause, immediately causes one of the current sensors to produce a feedback signal which reduces the current output of the power supply 12. Because the current sensors are located in both the positive and negative supply lines, between the respective power supply terminals and the closest current surge protectors, a short circuit condition is detected by the sensors regardless of whether it occurs in the positive or negative line and regardless of how close it is to the power supply. Once the short circuit is detected, the current supply is immediately reduced so that the short circuit cannot persist after the lightning surge or other fault condition has terminated. Consequently, the triggering of a CGA or the blowing of a fuse that might otherwise occur is avoided.

Figure 2:
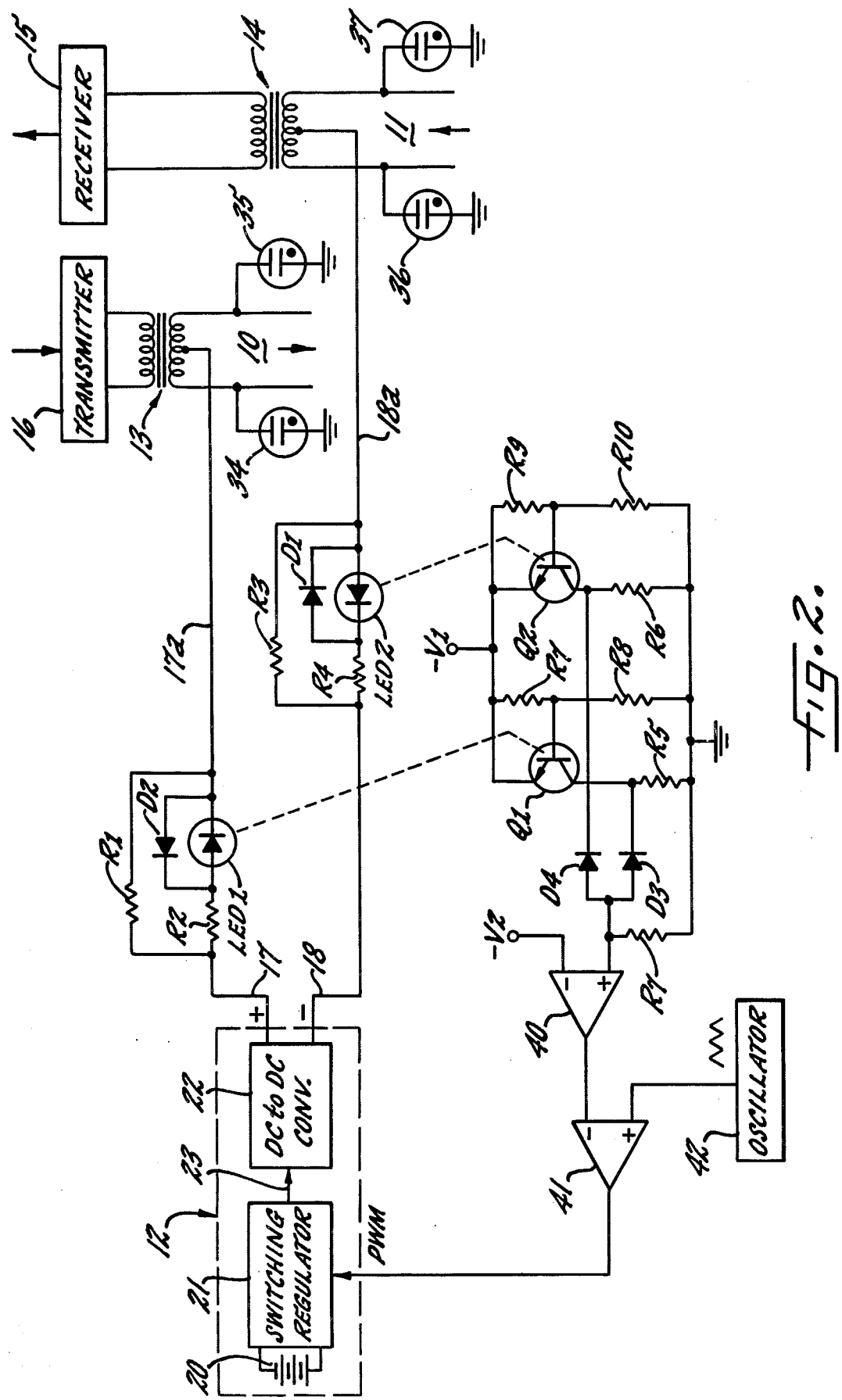
FIG. 2 is a more detailed diagram of one specific embodiment of the current regulation system shown in FIG. 1, for controlling the current supplied to a PCM transmission line.

In FIG. 2, a preferred embodiment of the system shown in FIG. 1 is illustrated in more detail. Common elements in the two figures have been identified by the same reference numerals. Referring to FIG. 2, the current sensors 25 and 26 comprise light-emitting diodes LED1 and LED2, each of which forms part of an optical coupler. More particularly, the light emitted by each diode LED1 and LED2 varies in proportion to the magnitude of the current flow in the respective power supply lines 17a and 18a. Part of the current in the positive line 17a is conducted around the diode LED1 through a resistor R1. The values of this resistor R1 and a second resistor R2, which is in parallel with the resistor R1 and in series with the diode LED1, are set to provide a level of current flow through the diode LED1 that causes this diode to operate in a linear region. Consequently, the light emitted by the diode LED1 is directly proportional to the magnitude of the current flow therethrough in the range of current values encountered in actual use. A similar pair of resistors R3 and R4 are associated with the diode LED2 in the negative supply line 18a to provide a similar proportional response in that diode.

To provide redundant protection for the light-emitting diode LED1 from positive lightning surges (in addition to the protection afforded by the usual current surge protectors) a conventional diode D1 is connected in parallel with the light-emitting diode LED1. In the event that a positive surge does not initiate conduction of one of the protectors, the excessive current surge causes the diode D1 to conduct and shunt the current around the diode LED1, thereby protecting the diode LED1 from damage. Redundant protection against negative lightning surges is not required, because a negative surge merely draws maximum current from the power supply 12 through the LED in the forward direction, which the LED can handle. Similarly, a conventional diode D2 is connected in parallel with the light-emitting diode LED2 in the negative line to protect LED1 from negative surges.

In the system shown in FIG. 2, the current surge protectors 30 and 31 are specifically illustrated as gas tube protectors, which represent the most common type of current surge protectors in current use. More particularly, gas tubes 34 and 35 are connected from the line side of the simplex transformer 13 to ground, and gas tubes 36 and 37 are connected from the line side of the simplex transformer 14 to ground. As is well known in the art, whenever the voltage level surges above the threshold level of one of these gas tubes, the tube is rendered conductive to shunt the excess current to ground.

In order to convert the light emitted by the diodes LED1 and LED2 to corresponding electrical signals, the light from these two diodes illuminates the base-emmiter junctions of a pair of phototransistors Q1 and Q2, respectively. The emitters of both the phototransistors Q1 and Q2 are connected to a voltage source $-V_1$, and the collectors are connected to ground through resistors R5 and R6, respectively. Biasing resistors R7, R8 and R9, R10 are connected across the respective base-emitter and collector-base junctions of the phototransistors Q1 and Q2.

As is well known, the forward bias across the base-emitter junctions of the phototransistors Q1 and Q2 varies in proportion to variations in the intensity of the illumination received from the respective diodes LED1 and LED2. The resulting current flow in the emitter-collector circuit of each phototransistor Q1 and Q2 is directly proportional to the intensity of the illumination received from the corresponding light-emitting diode LED1 or LED2. That is, as the current flow increases through either of the light-emitting diodes LED1 or LED2, the illumination from that particular diode increases in intensity, thereby increasing the current flow through the emitter-collector circuit of the corresponding phototransistor Q1 and Q2 by increasing the forward bias across the base-emitter junction of that phototransistor. Conversely, when the current flow through one of the light-emitting diodes LED1 or LED2 decreases, the intensity of illumination from that particular diode also decreases, thereby reducing the current flow through the corresponding phototransistor Q1 or Q2.

Since the principal purpose of the illustrative system is to protect against excessive current levels, the larger of the two current flows in the optical couplers is selected for use in controlling output of the power supply. Accordingly, the collectors of the two phototransistors Q1 and Q2 are connected to a "select largest" circuit comprising a pair of diodes D3 and D4 and a resistor R7. More specifically, the cathodes of the two diodes D3 and D4 are connected to the collectors of the transistors Q1 and Q2, respectively, and the anodes of the diodes D3 and D4 are connected to each other and to ground through the resistor R7. If the current flow through the phototransistor Q1 is greater than that through phototransistor Q2, the voltage level at the cathode of the diode D3 will be greater (i.e., more negative) than the voltage level at the cathode of the diode D4. Consequently, the diode D3 will conduct and reverse bias the diode D4. Conversely, if the current flow through the phototransistor Q2 is greater than that through phototransistor Q1, the negative voltage at the cathode of the diode D4 will be greater than that at the cathode D3, causing the diode D4 to conduct and reverse bias the diode D3. If desired, the resistors R5 and R6 may have slightly different values as a protection against instability of the Q1, Q2 circuit when both phototransistors are receiving the same light intensity.

Thus, it can be seen that the voltage drop across the resistor R7 at any given time will be proportional to the current flow through only one of the two phototransistors Q1 and Q2, namely, the particular phototransistor that is receiving the higher intensity illumination and permitting the greater current flow. Moreover, the voltage drop across the resistor R7 will vary in direct proportion to variations in the current flow through the light-emitting diode LED1 or LED2 that carries the larger current flow at any given time. Thus, the d-c. voltage level at the anodes of the diodes D3 and D4 may be referred to as an "actual current" signal.

This "actual current" signal is continuously applied to the non-inverting input of a differentail amplifier 40. The other input signal to this differential amplifer 40 is a "set current" signal derived from a reference voltage source $-V_2$ and applied to the inverting input of the amplifier 40. Thus, the differential amplifier 40 continuously monitors the "actual current" signal from the current-sensing optical couplers and produces a "current error" signal proportional to the algebraic sum of the "actual current" signal and the "set current" signal from the reference voltage source $-V_2$. That is, the magnitude of the "current error" signal represents the magnitude of the difference between the actual current level and the set level, and the polarity of the "current error" signal indicates whether the actual current is greater or smaller than the set level. Although the present invention is primarily concerned with those situations in which the actual current is greater than the set level, the illustrative system may also be used to regulate the current in those situations where it is below the set level.

This "current error" signal from the differential amplifier 40 is applied to the inverting input of a comparator 41 which receives an oscillatory signal at its non-inverting input from an oscillator 42. If desired, the oscillator 42 may comprise a conventional sawtooth signal generator. In response to these two input signals, the comparator 41 produces a series of output pulses whose width is determined by the magnitude of the "current error" signal from the differential amplifier 40 relative to the oscillatory signal from the oscillator 42. That is, the output pulses from the comparator 41 are pulse width modulated (PWM) according to the magnitude of the "current error" signal, which in turn represents the difference between the "actual current" signal from the current-sensing optical couplers and the "set current" signal from the reference voltage source $-V_2$.

FIG. 3 illustrates the operation of the comparator 41 in two different situations. In the first situation, the differential amplifier 40 produces a negative control signal $-I_e$ in response to an "actual current" signal below the level of the "set current" reference signal $I_r$. This negative signal $-I_e$ causes the comparator 41 to produce relatively wide positive-going pulses P (shaded in FIG. 3) because the sawtooth signal is above the level of $-I_e$ for the major portion of each cycle of the sawtooth signal. In the second situation illustrated in FIG. 3, the differential amplifier 40 produces a positive "current error" signal $+I_e$ in response to an "actual current" signal that is above the level of the "set current" signal $I_r$. The output of the comparator 41 goes high only when the sawtooth signal is more positive (or less negative) than the control signal $+I_e$, thereby producing relatively narrow positive-going pulses P' (shaded in FIG. 3) in response to the signal $+I_e$, regardless of whether $I_e$ is positive or negative (assuming $I_e$ remains within the amplitude of the sawtooth signal).

To control the width of the power pulses generated within the switching regulator 21, the width-modulated pulses from the comparator 41 are fed back to the control input of the switching regulator 21. As a result, the time intervals when the power switch within the regulator 21 is conductive correspond to the widths of the pulses from the comparator 41, thereby controlling the width of the power pulses produced within the switching regulator 21 to maintain a regulated power output on line 23 leading to the d-c.-to-d-c. converter 22. It will be understood that the switching regulator 21 and the d-c.-to-d-c. converter 22 may take a variety of different forms known in the art. As is well known, the control pulses fed to a switching regulator typically control the on and off times of one or more power transistors which control the flow of power from the source 20 to the converter 22. By repetitively turning the power transistor(s) on and off in response to the control pulses (sometimes referred to as "drive pulses"), the regulator produces a d-c. output which determines the ultimate power output from the converter 22. One example of a switching regulator suitable for use in the illustrative system is described in *Semiconductor Power Circuits Handbook* (Motorola Semiconductors Productions Inc., 1968).

The d-c-.-to-d-c. converter 22 preferably includes a coupling transformer to isolate the power source 20 from the supply lines 17 and 18. Such converters are also well known in the art, and one suitable example is described in *Semiconductor Power Circuits Handbook* (Motorola Semiconductors Productions Inc., 1968).

As can be seen from the foregoing detailed description, this invention provides an improved current regulation system for repeatered transmission lines which improves the reliability of the transmission during electrical storms, accidental grounding and the like. This system effectively regulates the line current in the event of grounding of either the positive or negative leg of the transmission line at any point between the positive and negative power supply terminals, regardless of how close the ground is to the power supply. Thus, this improved system reduces equipment maintenance requirements, with corresponding reductions in losses of transmission time. Furthermore, the improved system does not dissipate an excessive amount of power, operates at a high level of efficiency, and functions independently of ambient temperature.

I claim as my invention:

1. In a telephone transmission system having repeaters spaced along both the transmit and receive legs of the transmission line, a power supply for the repeaters including a current regulator, positive and negative supply lines connecting said power supply to the two legs of the transmission line, and current surge protectors connected from the two legs of said transmission line to ground,
    a pair of current sensors responsive to the current levels in said positive and negative supply lines, between said power supply and the current surge protectors closest to said power supply, for producing output signals representative of the respective current levels,
    control signal generating means receiving the output signals from said current sensors for producing a control signal in response to a deviation of the higher current in said supply lines from a preselected reference level, said control signal generating means including means for selecting the larger of the output signals from said current sensors, and means for producing said control signal in accordance with the deviation of the selected larger signal from said preselected reference level,
    and means for supplying said control signal to said current regulator to maintain the higher current level in said supply lines at said preselected reference level.

2. A telephone transmission system as set forth in claim 1 wherein said current regulator is a switching regulator for producing a d-c. output, and said control signal is a series of pulses which control the switching times of said regulator to modulate the width of the power pulses produced by said regulator, thereby controlling the level of the d-c. output of said regulator.

3. A telephone transmission system as set forth in claim 1 wherein said current sensors include optical couplers for isolating the power source for said current regulator from said supply lines.

4. A telephone transmission system as set forth in claim 1 wherein said current surge protectors comprise gas discharge tubes.

5. In a telephone transmission system having repeaters spaced along both the transmit and receive legs of the transmission line, a power supply for the repeaters including a current regulator, positive and negative supply lines connecting said power supply to the two legs of the transmission line, and current surge protectors connected from the two legs of said transmission line to ground,
    a pair of current sensors responsive to the current levels in said positive and negative supply lines, between said power supply and the current surge protectors closest to said power supply, for producing output signals representative of the respective current levels,
    means for selecting the larger of the two output signals from said current sensors,
    a reference signal source for producing a signal representing said preselected reference level,
    means responsive to the selected larger output signal from said sensors and said reference signal for producing a current error signal representing the difference between said larger output signal and said reference signal,
    a source of an oscillatory signal
    a comparator for comparing said current error signal with said oscillatory signal to produce a series of control pulses whose width varies according to the magnitude of said current error signal,
    and means for supplying said control pulses to said current regulator to maintain the higher current level in said supply lines at said selected reference level.

6. In a telephone transmission system having repeaters spaced along both the transmit and receive legs of the transmission line, a power supply for the repeaters including a current regulator, positive and negative supply lines connecting said power supply to the two legs of the transmission line, and current surge protectors connected from the two legs of said transmission line to ground,
    a pair of current sensors responsive to the current levels in said positive and negative supply lines, between said power supply and the current surge protectors closest to said power supply, for producing output signals referenced to ground and representative of the respective current levels,
    a reference signal source for producing a signal representing a preselected reference level relative to ground, means responsive to the output signals from said sensors and said reference signal for producing a current error signal representing the difference between said reference signal and the larger of the two output signals from said current sensors, a source of an oscillatory signal, a comparator for comparing said current error signal with said oscillatory signal to produce a series of control pulses whose width varies according to the magnitude of said current error signal, and means for supplying said control pulses to said current regulator to maintain the higher current level in said supply lines at said preselected reference level.

* * * * *